United States Patent
Cheng

(10) Patent No.: US 11,121,418 B2
(45) Date of Patent: Sep. 14, 2021

(54) COKE POWDER AS A DISCHARGING AGENT FOR WASTE BATTERY RECYCLING AND METHOD THEREOF

(71) Applicant: Omega Harvested Metallurgical, Inc, Canal Winchester, OH (US)

(72) Inventor: Hsinghua Cheng, Canal Winchester, OH (US)

(73) Assignee: Omega Harvested Metallurgical, Inc., Canal Winchester, OH (US)

( * ) Notice: Subject to any disclaimer, the term of this patent is extended or adjusted under 35 U.S.C. 154(b) by 0 days.

(21) Appl. No.: 16/731,843

(22) Filed: Dec. 31, 2019

(65) Prior Publication Data

US 2021/0203017 A1   Jul. 1, 2021

(51) Int. Cl.
| | |
|---|---|
| *H01M 10/54* | (2006.01) |
| *H01M 10/44* | (2006.01) |
| *H01M 10/0525* | (2010.01) |
| *H01M 6/52* | (2006.01) |
| *C01B 32/05* | (2017.01) |
| *C01B 32/215* | (2017.01) |

(52) U.S. Cl.
CPC ............ *H01M 10/54* (2013.01); *C01B 32/05* (2017.08); *C01B 32/215* (2017.08); *H01M 6/52* (2013.01); *H01M 10/0525* (2013.01); *H01M 10/443* (2013.01)

(58) Field of Classification Search
CPC ...... H01M 10/54; H01M 10/443; H01M 6/52; H01M 10/0525; C01B 32/215; C01B 32/05; C10J 2300/0943; C10G 2300/708
See application file for complete search history.

*Primary Examiner* — Daniel C. McCracken
(74) *Attorney, Agent, or Firm* — Muncy, Geissler, Olds & Lowe, P.C.

(57) ABSTRACT

The invention discloses the discharging method and discharging agent for recycling waste batteries. It immerse the waste batteries with coke powder to form a discharging circuit and to remove the residual power off the waste batteries before destruction of the batteries. The discharging performance varied with resistivity of the coke powder, and can be measured by watching the temperature and/or the temperature change trend. The resistivity depends on the ratio of carbon composition of the coke powder and the contact quality between the coke powder and the waste batteries, and the pressure on coke powder can adjust the contact quality. Therefore, the method is able to adjust the discharging performance by adjusting the pressure to meets the discharging requirements of efficiency and safety.

20 Claims, 2 Drawing Sheets

COKE POWDER AS A DISCHARGING AGENT FOR WASTE BATTERY RECYCLING AND METHOD THEREOF

FIELD OF THE INVENTION

The present invention relates to a discharging agent and method of recycling waste batteries, and especially relates to applying the coke powder in the discharging of recycling the waste batteries.

BACKGROUND OF THE INVENTION

A lot of lithium-ion batteries will generally be retired as power batteries for each year in the future 4-5 years. Before recycling the waste lithium-ion batteries, it is necessary to release the residual power of these batteries to meet the requirements of job safety and environment safety. There were known discharging methods, such as equipment discharging, brine discharging and graphite discharging.

For equipment discharging, a waste battery is connected to a device and forms a discharging circuit to take the chemical energy off the battery. It needs to customize the discharging circuit for each type of battery, so it is very cost inefficient and hard to meet the requirements of industrial scale.

For brine discharging, the waste batteries are immersed in alkali or acid solution to absorb the battery energy. The place near the cathode generates a lot of hydrogen and the brine solution contaminates the environment if it leaks, so it incurs the risk of environment safety.

For graphite discharging, a kind of dry discharging, the graphite powder covers the batteries to be as the discharging agent. The waste batteries discharge fast because of the high conductivity of the graphite, and that incurs easily the risk of the public safety and environmental safety.

For liquid nitrogen discharging, the waste batteries become inactive in the liquid nitrogen, in extra-low temperature, and then can be destroyed safely. The cost is very high due to the consumption of liquid nitrogen, so the industrial scale is limited.

This paper proposes a discharging method and material for recycling the waste batteries to solve the issues of scale application, discharging efficient, workplace safety and environment safety.

SUMMARY OF THE INVENTION

The coke powder, used as the discharging agent of the waste battery recycling, is a kind material with rich carbon composition. In generally, the coke powder comprises carbon composition 65 to 99 wt %, ash composition 0.5 to 18%, volatile composition 0.5 to 3%, and water 0.5 to 13%. The coke powder, with an uncertain crystal structure, resistivity about 0.08-0.35 Ω·cm, specific heat capacity about 0.78-1.5 kj/(kg·K), thermal conductivity 2.09-2.91 kj/(m·h·K) and grounded to have particle size from 0.1 to 0.6 mm, are used as the discharging agent in recycling waste batteries.

The discharging method for waste battery recycling by using the coke powder comprises:
(1) wrapping waste batteries in coke powder with thickness 5-10 cm in a container;
(2) monitoring a temperature and/or a temperature trend during discharging;
(3) adjusting a pressure on the coke powder, wherein the pressure adjustment is according to the temperature and/or the temperature trend by the way below:

(a) to reduce the pressure if the temperature change trend is higher than a temperature rise threshold;
(b) to increase the pressure if the temperature change trend is lower than a temperature drop threshold; and
(c) to stop the pressure if a cutoff conditions is reached.

The method can also apply for the half-device discharging of the waste batteries by replacing the batteries by the half-device with batteries.

BRIEF DESCRIPTION OF THE DRAWINGS

Various embodiments are depicted in the accompanying drawings for illustrative purposes, and should be not interpreted to limit the scope of the invention. Moreover, the scope of the patent should be defined according to the claims. Various features of different disclosed embodiments can be combined or de-combined to form additional embodiments, which are part of this disclosure.

DETAILED DESCRIPTION

Figure 1:
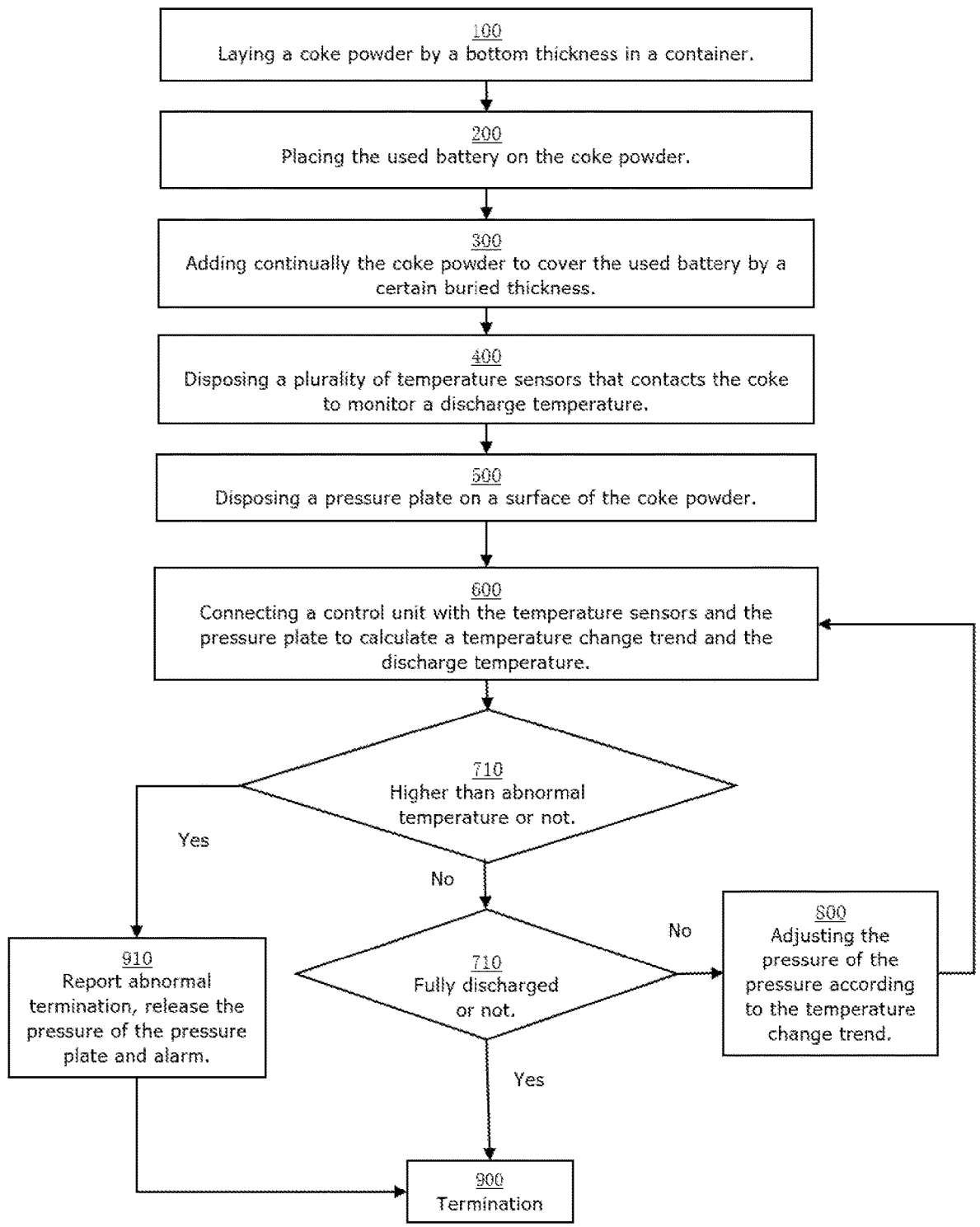
FIG. 1 is a schematic diagram of the discharge process.

The coke powder generally comprises carbon composition 65 to 99 wt %, ash composition 0.5 to 18%, volatile composition 0.5 to 3%, water 0.5 to 13%, and has an uncertain crystal structure. Such coke powder are grounded to a particle size 0.1 to 0.6 mm, a resistivity 0.08-0.35 Ω·cm, a specific heat capacity 0.78-1.5 kj/(kg·K), and a thermal conductivity 2.09-2.91 kj/(m·h·K). The coke powder is used as the discharging agent for recycling the waste batteries in this invention. The carbon composition is the source of conductivity, and to adjust the ration of carbon composition can adjust the conductivity. Moreover, the inventor found that the conductivity can be controlled by adjust the pressure on the coke powder. The inventor use the controllability to control the discharging performance in recycling waste batteries.

In one embodiment of this invention, the coke powder, with resistivity about 0.08 to 0.35 Ω·cm, the thermal conductivity about 2.64 kj/(m·h·k), is used. In a preferred embodiment, the coke powder with resistivity about 0.1 to 0.2 Ω·cm, the carbon composition about 80 to 90%, is used. Table 1 below the compositions of the coke powder (% by weight) of one embodiment:

TABLE 1

| | |
|---|---|
| Carbon: 86~91 | Water: 3~13 |
| Quartz: 0.01~1 | Sulphur: 0.6~0.8 |
| Sodium monoxide: 0.01~0.7 | Calcium oxide: 0.01~0.3 |
| Magnesium oxide: 0.01~0.3 | Potassium oxide: 0.01~0.2 |
| Titanium Dioxide: 0.01~0.2 | Alumina: 0.2~3 |
| Iron oxide: 0.01~2 | Manganese oxide: 0.01~0.02 |

Figure 2:
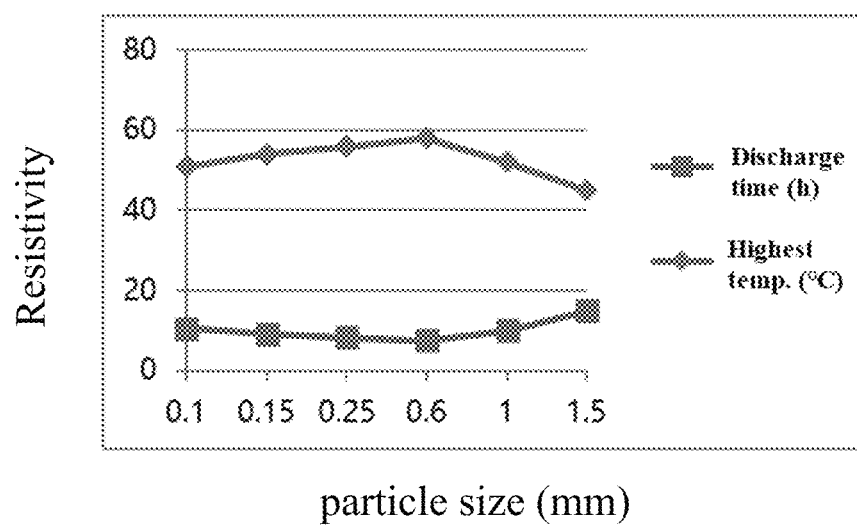
FIG. 2 shows the resistivity with different particle size.

In general, the larger particle size of the coke is, and the smaller the resistivity is, but worse contact quality is, that means area of waste batteries and the coke powder is small. The resistivity (conductivity) and the contact quality are the main factors of discharging performance. FIG. 2 shows the resistivity with different particle size, which ranges from 0.1 to 1.5 mm. FIG. 2 shows better discharging performance with particle size 0.1-0.6 mm.

The conductivity increases when the particle size is getting larger. If the particle diameter is larger than about 1.0 mm, the effective contact area between the coke particles and the waste batteries reduces, as a result to have worse discharging performance. Experimental data shows that the coke powder with particle size within 1.5 mm achieves a good discharge effect, and the particle with size 0.25-0.6 mm is preferred. Especially, the temperature during discharging can be lower than 60° C., which is a critical temperature for safety of discharging. It is better to have a high discharging rate under the safety temperature, which depends on the kinds and types of the waste battery.

The discharging method is to wrap (immerse) the waste batteries in coke powder with a specific thickness, 5-10 cm proposed here, to form the discharging circuit, and watch the temperature variation or the voltage of the wastes batteries to know the discharging status to adjust the pressure on coke powder. It speeds up the discharging rate by increasing the pressure and slows down by decreasing the pressure on the coke powder. The discharging rate can be sensed by a temperature change trend of discharging. Fast discharging rate has a larger temperature change trend and slow discharging rate has a smaller temperature change trend. Therefore, the discharging rate can be controlled by adjusting the pressure on the coke powder according to the temperature change trend. Another is to watch the voltage variation of the waste batteries during discharging.

In some embodiments, the (rise/drop) threshold of temperature change trend are set at ±2° C. It slows down the discharging rate if the temperature change trend is higher than 2° C., or it speeds up the discharging rate if the temperature change trend is lower than −2° C. The rise/drop threshold of the temperature change trend control the discharging rate of recycling the waste batteries during the discharge process.

The stop condition of discharging include abnormal condition and discharge-completed condition. If the temperature change trend rises and reaches a critical temperature, 60° C. in general, the discharging process stops and removes the pressure from the coke powder. The waste batteries discharge too fast to explode and to incur the risk of workplace safety. In general, the waste batteries will incur a risk of explosion if the discharging temperature is higher than 60° C.

If the temperature approaches to the temperature of environment and/or the voltage of the waste batteries is lower 1 volt, the waste batteries discharge completely, and the pressure on coke powder can be removed and the waste batteries can be removed from the container. The coke powder can be reused as the discharging agent for recycling another batch of the waste batteries.

The sole figure shows an embodiment, which is a schematic diagram of the discharge process, described below:
step 100: laying coke powder by a bottom thickness, i.e. 5-10 cm, in a container;
step 200: placing the waste batteries on the coke powder;
step 300: laying continually the coke powder on the waste batteries by a certain buried thickness, i.e. 5-10 cm;
step 400: monitoring discharging a temperature and/or a residual voltage of the waste batteries by temperature sensor (s) and/or voltage sensor(s);
step 500: disposing a pressure plate on the coke powder;
step 600: calculating a temperature change trend;
step 710: determining the status of discharging is abnormal,
step 720: determining the status of discharge-completed, or
step 800: adjusting the pressure on the coke powder according to the temperature change trend;
step 910: releasing the pressure on coke powder if abnormal or discharge-completed; and
step 900: terminating the discharging.

In one embodiment, the pressure adjustment can range between 0 and 2000N and the adjustment value in the embodiment is 500 Newtons (N) each time is listed in Table 2 below:

TABLE 2

| Temperature change (ΔTs) | ΔTs ≥ 2° C. | ΔTs ≤ −2° C. | −2 < ΔTs < 2 |
|---|---|---|---|
| pressure adjustment | Decrease 500 N | Increase 500 N | No action |

There are several ways to determine the completion of discharged batteries:
(1) The first is the temperature determination: when the battery discharging temperature gradually drops to the vicinity of the environment temperature. For example, difference between battery temperature and ambient temperature≤3° C.
(2) The second method is voltage determination: when voltage of the waste batteries drops into below 1 volt. In this embodiment, the critical voltage is set at 0.5V.

The maximum temperature and the time to complete the discharging process for different batteries are listed in the Table 3 below:

TABLE 3

| Type of battery | capacity (mAh) | initial voltage (mV) | discharging time (within 0.5 V) (h) | Maximum temperature (° C.) |
|---|---|---|---|---|
| MnNiCo ternary battery 18650 | 2600 | 4100 | 9 | 50 |
| MnNiCo ternary battery 18650 | 3400 | 4050 | 7.5 | 56 |
| Lithium iron battery 32700 | 6000 | 3300 | 11.5 | 46 |

The method can also apply for the semi-device discharging, and the maximum temperature and time to complete the discharging process are listed in Table 4 below:

TABLE 4

| Type of battery | capacity (mAh) | initial voltage (mV) | discharging time (within 0.5V) (h) | Maximum temperature (° C.) |
|---|---|---|---|---|
| Semi-device | 2600 | 3910 | 24 | 45 |

To complete discharging process for the waste battery (3400 mAh 18650), the discharging time and the maximum temperature for different particle of the coke powder are shown in Table 5:

TABLE 5

| | Particle diameter (mm) | | | | | |
|---|---|---|---|---|---|---|
| | 0.1 | 0.15 | 0.25 | 0.6 | 1 | 1.5 |
| Discharge time (h) | 10.5 | 9.2 | 8.3 | 7.5 | 10 | 15 |
| Maximum temperature (° C.) | 51 | 54 | 56 | 58 | 52 | 45 |

The device for discharging by the coke powder according to the present invention comprises a container, a temperature sensor and/or a voltage sensor, a pressure plate, and a control unit.

The container used as carrying the coke powder and the waste battery.

The temperature sensor(s) may be connected to the waste batteries, buried in coke powder near the waste batteries, inner wall of the container, or attached on the surface of one waste battery. The voltage sensor pair are attached on cathode and anode of the waste battery in a way, such through magnets.

The pressure plate is disposed on the top of the container to apply a pressure on the coke powder to adjust the contact quality between the coke powder and the waste battery.

The control unit connects to the temperature sensor(s) and/or the voltage sensor(s), and the pressure plate, and then the control unit is able to calculate a temperature change trend to adjust the pressure plate to adjust the pressure on the surface of the coke powder.

The waste batteries comprise Li-ion, Ni—Cd, Zinc, Ni—MH . . . batteries, disposal (primary) or rechargeable (secondary) batteries, or single-cell or module batteries.

The embodiments described above are merely illustrative of the technical spirit and features of the present disclosure, and are intended to enable those skilled in the art to understand the present disclosure and exploit the present disclosure. The scope of the claim, that is, the equivalent changes or modifications made by the spirit of the present disclosure, should still be included in the scope of the claim of the present disclosure.

What is claimed is:

1. A coke powder for recycling waste batteries, comprising a carbon composition of 65-99 wt %, an ash composition of 0.5-18%, a volatile composition of 0.5-3%, and a water composition of 0.5-13%, wherein the coke powder has a resistivity of 0.08-0.35 Q·cm, a specific heat capacity of about 0.78-1.5 kj/(kg·K), a thermal conductivity of 2.09-2.91 kj/(m·h·K), and a particle size of 0.1-0.6 mm.

2. The coke powder for recycling waste batteries according to claim 1, wherein a ratio of the carbon composition is 80-90 wt %.

3. The coke powder for recycling waste batteries according to claim 2, wherein the particle size is 0.25-0.6 mm.

4. A discharging method for recycling waste batteries, comprising:
    wrapping waste batteries in coke powder with a wrap thickness in a container to form a discharging circuit between cathode and anode of the waste batteries, wherein the coke powder comprises a carbon composition of 65-99 of wt %, an ash composition of 0.5-18%, a volatile composition of 0.5-3%, and a water composition of 0.5-13%, wherein the coke powder has a resistivity of 0.08-0.35 Q·cm, a specific heat capacity of about 0.78-1.5 kj/(kg·K), a thermal conductivity of 2.09-2.91 kj/(m·h·K), and a particle size of 0.1-0.6 mm;
    monitoring a temperature and a temperature trend during discharging;
    adjusting a pressure on the coke powder to adjust the discharging rate according to the temperature or the temperature trend in the way:
    to reduce the pressure if the temperature change trend is higher than a temperature rise threshold;
    to increase the pressure if the temperature change trend is lower than a temperature drop threshold; and
    to stop the pressure if a cutoff condition is reached.

5. The discharging method for recycling waste batteries according to claim 4, wherein the wrap thickness is about 5-10 cm.

6. The discharging method for recycling waste batteries according to claim 4, wherein the step of adjusting the pressure is to adjust a pressure plate on a surface of the coke powder.

7. The discharging method for recycling waste batteries according to claim 4, wherein the step of adjusting the pressure comprises
    increasing the pressure to speed up the discharging rate when the temperature change trend is lower than a drop threshold; or
    decreasing the pressure to slow down the discharging rate when the temperature change trend is higher than a rise threshold; or
    keeping the pressure to maintain the discharging rate when the temperature change trend is between the rise threshold and the drop threshold.

8. The discharging method for recycling waste batteries according to claim 7, wherein the rise threshold is 2° C.

9. The discharging method for recycling waste batteries according to claim 7, wherein the drop threshold is −2° C.

10. The discharging method for recycling waste batteries according to claim 4, wherein the cutoff condition is an abnormal condition, that the discharging temperature has reached a specific temperature and the temperature change trend continues to rise.

11. The discharging method for recycling waste batteries according to claim 10, wherein the specific temperature is 60° C.

12. The discharging method for recycling waste batteries according to claim 4, wherein the cutoff condition is a discharge-completed condition, that the discharging temperature has drop into a specific vicinity of an environment temperature.

13. The discharging method for recycling waste batteries according to claim 12, wherein the specific vicinity is 3° C.

14. The discharging method for recycling waste batteries according to claim 4, wherein the cutoff condition is a discharge-completed condition, that a maximum voltage of the waste batteries has been lower than a critical voltage.

15. The discharging method for recycling waste batteries according to claim 14, wherein the critical voltage is about 0.5-1 volt.

16. The discharging method for recycling waste batteries according to claim 4, wherein the waste batteries are disposable (primary batteries) or rechargeable (secondary batteries).

17. The discharging method for recycling waste batteries according to claim 4, wherein the waste batteries comprises lithium-ion batteries.

18. The discharging method for recycling waste batteries according to claim 4, wherein the waste battery is a single-cell battery.

19. The discharging method for recycling waste batteries according to claim 4, wherein the step of wrapping the waste batteries comprises:
    laying a coke powder by a bottom thickness in a container;
    placing at least a waste battery on the coke powder; and
    placing continually the coke powder to the waste batteries by a buried thickness.

20. The discharging method for recycling waste batteries according to claim 19, wherein the bottom thickness and the buried thickness are about 5-10 cm.

* * * * *